Jan. 30, 1962  R. J. BRASKI ETAL  3,019,320
THERMOSTAT

Filed July 9, 1958  3 Sheets-Sheet 1

INVENTORS:
RAYMOND J. BRASKI
WALTER W. KRAUSE
BY
ATT'Y

Jan. 30, 1962 R. J. BRASKI ETAL 3,019,320
THERMOSTAT
Filed July 9, 1958 3 Sheets-Sheet 2

INVENTORS:
RAYMOND J. BRASKI
WALTER W. KRAUSE
BY
ATT'Y

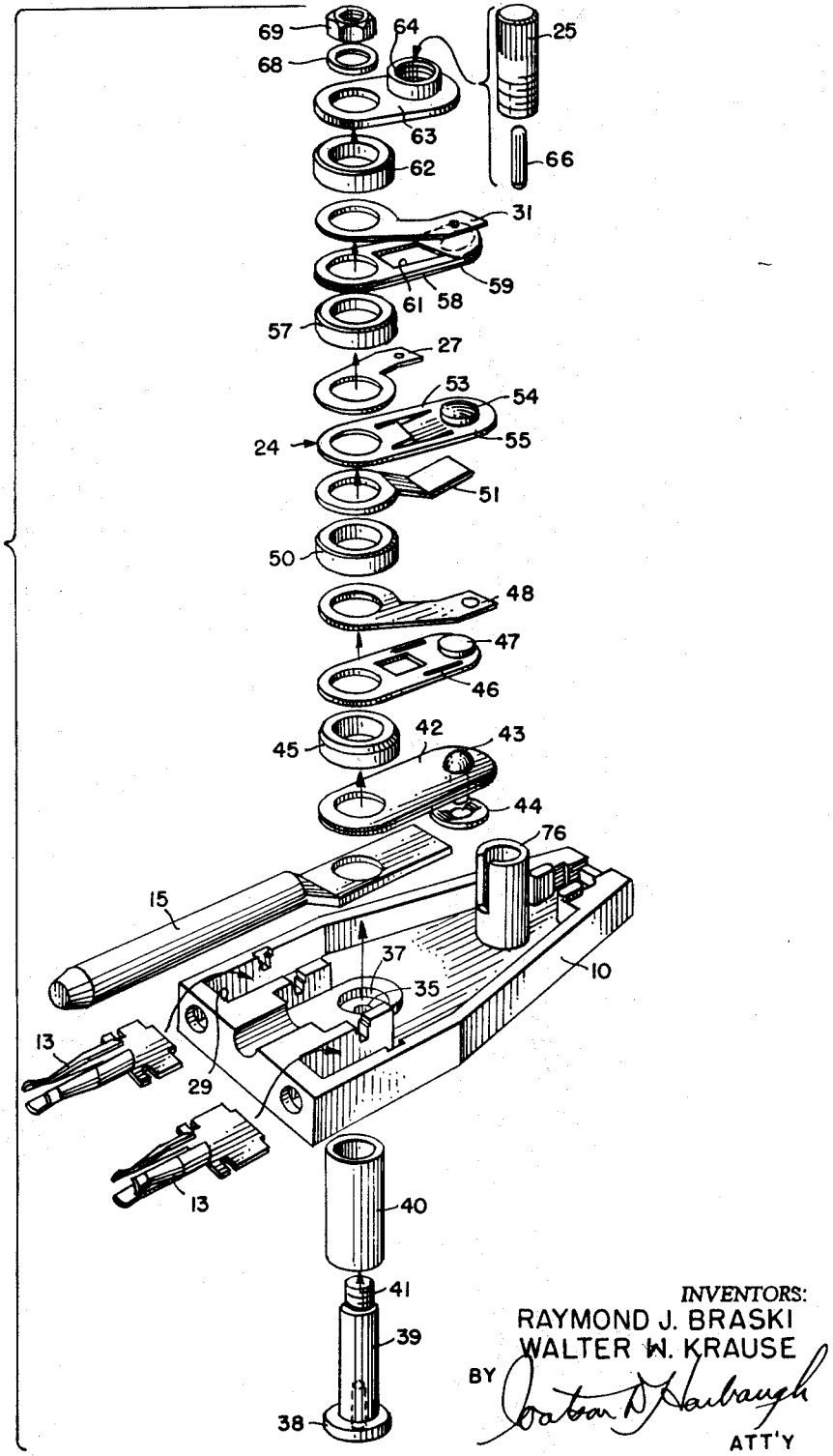

United States Patent Office 3,019,320
Patented Jan. 30, 1962

3,019,320
THERMOSTAT
Raymond J. Braski and Walter W. Krause, Chicago, Ill., assignors, by mesne assignments, to Webcor, Inc., Chicago, Ill., a corporation of Illinois
Filed July 9, 1958, Ser. No. 747,449
19 Claims. (Cl. 200—136.5)

The present invention relates to a thermostat. More particularly it has to do with a thermostatic switch assembly for controlling the operation of an appliance and it is most advantageously featured in an appliance plug including the thermostatic switch assembly.

Automatic-cycling appliances have become somewhat commonplace. Particularly in the field of electrical cooking appliances, there are numerous more or less automatic control systems for overseeing operation of the apparatus. However, there is a definite need for improvement in such control devices in view of certain prior-art disadvantages some of which have heretofore seemed inevitable without undue complexity and/or expense.

In certain appliances, such as electric fry-pans, sauce pans, coffee makers and the like, it is highly desirable to have extremely accurate thermostatic controls which yet must be comparatively inexpensive if the appliance is to achieve commercial success. One problem attendant to such kitchen appliances stems from the necessity of regularly cleansing the actual cooking parts of the appliance, a procedure incompatible in many respects with the existence of electrical control elements. In partial answer to this problem, it has been suggested to hermetically seal the control unit within the body or base of the appliance. However, this approach has been found to present numerous drawbacks, including lack of accessibility for servicing and adjustment, increased cost, and inability to take advantage of the possibilities of utilizing one control unit to operate in turn two or more different appliances.

To overcome these difficultiies, detachable control units have been suggested and to some extent tried. Usually, these have taken the form of a thermostatic assembly in combination with a receptacle unit mating with suitable terminals on the appliance. Such detachable units as have been available generally have suffered from one or more of lack of durability, ruggedness, economy of manufacture, satisfactory precision of temperature control, and ease and versatility of adjustment.

Accordingly, it is a general object of the present invention to provide a new and improved detachable appliance plug which overcomes the aforementioned problems and disadvantages.

It is another object of the invention to provide a new and improved appliance plug which is capable of accurately controlling the temperature of the appliance and yet which is easy to control and adjust.

A further object of the persent invention is to provide a new and improved detachable appliance plug which is economical to manufacture and yet which demonstrates a ruggedness and durability sufficient to withstand unusually rough service.

It is still another object of the present invention to provide a new and improved detachable appliance plug which achieves the foregoing objects and which is compact and light-weight while being suitable for enclosure within a housing of pleasing appearance to the user.

Particular attention has long been given to automatic coffee makers. Apparatus for reasonably accurately controlling the brewing of a pot of coffee has been developed. However, there has been a demand not only for control of the brewing cvcle but for subsequent maintenance of the brewed coffee at a lower, near-drinking temperature: many conventional control approaches require re-initiation of the brewing cycle in order to again energize the heating elements after completion of the first brewing cycle.

To the present, various schemes have been suggested, and some tried, for keeping brewed coffee warm following the brewing cycle. However, those arrangements which have proved reasonably successful in both accurately controlling the brewing and sufficiently well-controlling the warming cycles have suffered from one or more disabilities. In general, the better systems have proved fairly expensive to manufacture, have often been difficult to maintain in satisfactory operating condition, have been comparatively expensive, and have often lacked in durability and ruggedness in use.

It is accordingly still another object of the present invention to provide a thermostatic switch assembly which overcomes these unfavorable limitations.

A still further object of the present invention is to provide a thermostatic switch assembly capable of being utilized either in a detachable plug, within the appliance itself, or in some other housing, and which is characterized especially by simplicity of construction with resultant economies in manufacture and ease of operation and servicing.

It is still another object of the present invention to provide such a thermostatic switch assembly which is extremely durable and rugged and which is characterized by simplicity of fabrication while yet providing all the necessary functions to completely control both the brewing and the subsequent warming cycles of a coffee maker.

An appliance plug constructed in accordance with the present invention includes a housing of insulating material enclosing a pair of power input terminals spaced apart in one end portion of the housing. Projecting outwardly from the housing between the receptacles is a heat conductive prong disposable within the body of the associated appliance. A primary switch couples the input terminals to the output terminals and is operated under the control of thermostatic means responsive to a predetermined temperature in the prong for opening the switch. There is also an auxiliary switch in the housing responsive to opening of the primary switch for thereafter periodically coupling and de-coupling the input terminals and output receptacles at a predetermined rate.

The thermostatic switch assembly as contemplated by the present invention, and which is eminently suitable for utilization in the appliance plug, includes means carrying first and second contacts and responsive to movement of the contacts a selected distance away from a first stable position to move the contacts further into a second stable position. The switch further comprises means, including a primary contact engageable with the first contact only in the first position thereof, responsive to a predetermined temperature change for moving the engaged first and primary contacts the selected distance. The switch also includes means, including a secondary contact engageable with the second contact in the second position, responsive to cyclic temperature to move the second and secondary contacts alternately into and out of engagement while the second contact is in the second position.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

FIG. 6 is an exploded perspective view of the thermostatic switch assembly illustrated in FIGS. 4 and 5.

Figure 1:
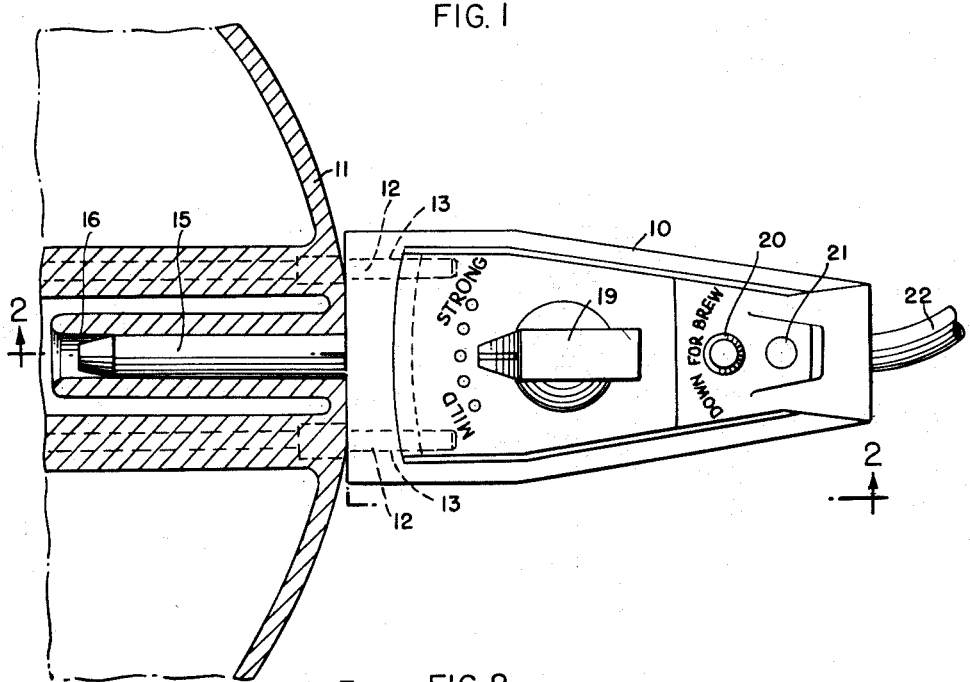
FIG. 1 is a view, partially in cross section, of an appliance plug constructed in accordance with the present invention and matingly engaged with an appliance.
Figure 2:
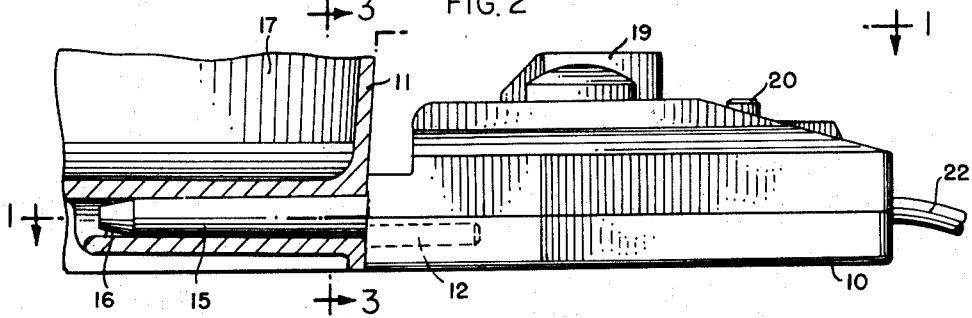
FIG. 2 is a fragmentary cross-sectional view taken along the line 2—2 in FIG. 1.
Figure 3:
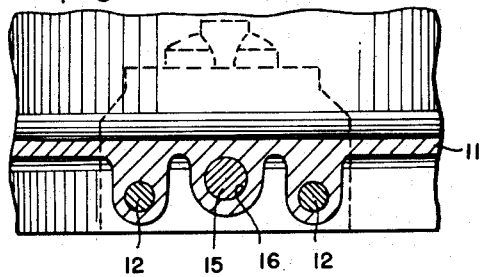
FIG. 3 is a fragmentary cross-sectional view taken along the line 3—3 in FIG. 2.

The plug assembly illustrated in FIG. 1 includes a housing 10, of heat insulative material such as Bakelite, abutting against the exterior of a coffe-maker 11 only a portion of which is depicted. Projecting outwardly and insulated from the shell of coffee-maker 11 are a pair of spaced electric plug elements 12 received within female receptacles 13 spaced apart in one end of housing 10. Plug elements 12 are electrically connected to opposite ends of a heater (not shown) disposed within the body of coffee maker 11 for heating the water contained in the brewing chamber. Spaced between receptacles 13 and projecting outwardly from that end portion of housing 10 is a prong 15 of heat conductive material such as aluminum and receivable within a recess 16 in the coffee maker. Recess 16 is defined by a heat conductive material, also preferably of aluminum having a surface in thermal contact with the brewing chamber so as to be responsive to the temperature of the brewing or brewed liquid contained within chamber 17 (FIG. 2).

Conveniently positioned on the upwardly facing surface of housing 10 is a control knob 19 having a pointer movable along a series of indicia for selecting the brewing time within a range for producing varying strengths of the coffee from mild to strong as indicated. Outwardly of control knob 19 and also on the upper surface of housing 10 is a push button indicated "down for brew." As will be more fully understood from the following description, the brewing cycle is initiated merely by depressing button 20 and then releasing it. On outwardly of push button 20 is an opening in the housing through which is seen an indicator light 21 which glows steadily during the heating cycle and which is extinguished upon completion thereof. Finally, a power cord 22 having a conventional plug at its external end is led into housing 10 through the outward end portion thereof.

Figure 4:
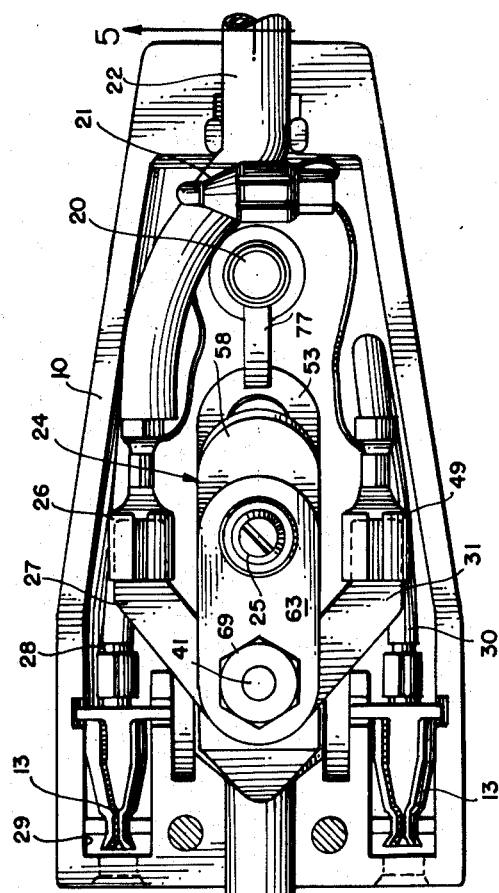
FIG. 4 is an enlarged plan view of the plug assembly of FIG. 1 with the housing cover removed.

FIG. 4 illustrates the detachable appliance plug removed from the coffee maker and with control knob 19 and the upper half of housing 10 removed to expose the interior. Centrally disposed within housing 10 is a thermostatic switch stack generally indicated by the numeral 24. Projecting upwardly from assembly 24 is a knurled hollow control shaft 25 on which control knob 19 is affixed when the unit is assembled. One wire of power cord 22 terminates in an input terminal 26 in the form of a female lug engageable with a connecting leaf 27 projecting outwardly to one side of stack 24. The other wire in cord 22 constitutes an input terminal 28 electrically joined to one of female output receptacles 13, the latter being carried within a guideway 29 formed in housing 10 near the end thereof from which prong 15 projects and spaced to one side of the prong. The other female output receptacle 13 is disposed on the opposite side of prong 15 and is also carried in a similar guideway formed in housing 10. This other output terminal is electrically connected by a lead 30 to a connecting leaf 31 projecting from the adjacent side of stack 24.

Figure 5:
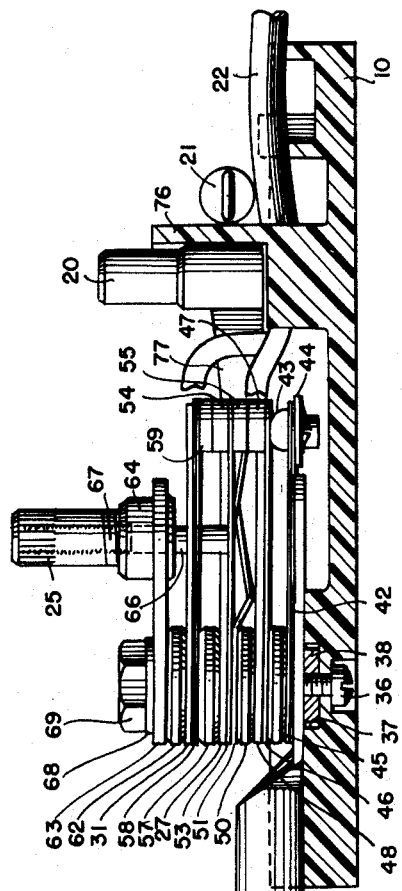
FIG. 5 is a cross-sectional view taken along the line 5—5 in FIG. 4.

Switch stack 24 is most clearly depicted in the exploded view of FIG. 6 with corrolary reference to the assembled view of FIG. 5. Centrally disposed in the bottom of housing 10 near the innermost end of prong 15 is an opening 35 to receive a screw 36, the lower end of opening 35 being counterbored to accept the head of screw 36. The upper end of opening 35 is counterbored at 37 to seat the enlarged head 38 of an upwardly projecting pin 39, screw 36 being threaded into the lower end of pin 39 to securely fasten the latter in an upright position. For rigidity, pin 39 preferably is metallic and is ensleeved by a hollow cylinder 40 of insulating material and of a length exposing only an uppermost threaded portion 41 of pin 39. While various insulating materials may be utilized for sleeve 40, and for other insulating washers about to be described, the material preferably is a vitreous ceramic having not only good electrical insulation properties but also having good resistance against adverse effects in the presence of heat.

The elements of stack 24 now to be described are all apertured to slide over sleeve 40, one on top of another. Thus, the innermost end portion of prong 15 is flattened and drilled to ride over sleeve 40 and rest in a position between receptacles 13, insulated therefrom. Immediately on top of the flattened portion of prong 15 is a bi-metal wafer 42 which when assembled is pressed into good thermal contact with the material of prong 15. Received in the free end of wafer 42 is a ceramic button 43 projecting upwardly from the wafer on one side and having a lock ring 44 pressed onto its downwardly projecting terminus to firmly lock it in place. Wafer 42 flexes upwardly in response to increasing temperature in prong 15.

Next in the stack, from bottom to top, is a ceramic washer 45 separating wafer 42 from the next succeeding element which is a switch blade 46 carrying a primary contact 47 projecting upwardly from its free end. Switch blade 46 is flexible and is aligned with bi-metal wafer 42 so that button 43 bears against the switch blade underside. On top of blade 46 and in electrical contact therewith, is a contact leaf 48 projecting outwardly on the same side as contact leaf 31 and connected to lead 30 by the same crimp connector 49 (FIG. 4).

Immediately above leaf 48 is another ceramic washer 50 on top of which is disposed a limiting stop 51. Stop 51 is a strip aligned with blade 46 and wafer 42 and which progressing outwardly from sleeve 40, first bends downward and then bends slightly upward; the purpose of this stop will appear more fully hereinafter. On top of stop 51 is a snap-blade 53 carrying first and second oppositely facing contacts 55 and 54 on its free end. Contact 55 is positioned to mate with contact 47. Snap blade 53 is slotted along its two side portions between the contacts and sleeve 40 and has its central portion between the slots bent downwardly at about the middle so as to afford self-contained over-center snap action. As so constructed, blade 53 has two stable positions. In its first position contact 55 is engageable with contact 47. Upon flexure of wafer 42, blade 46 is urged upwardly and contact 47 pushes against contact 55 and moves snap-over blade 53 away from this stable first position into its second stable position at which time electrical contact between contacts 55 and 47 is broken; by reason of the snap action of blade 53, contacts 55 and 47 may be in engagement only when blade 53 is in its lower stable position.

Contact leaf 27, previously described in discussing FIG. 4, is disposed above snap-over blade 53 in electrical contact therewith. Next in the stack is another ceramic washer 57 electrically separating contact 27 from a flexible bi-metal wafer 58 also aligned with blades 53, 46 and wafer 42. Carried on the outer end of wafer 58 is a downwardly facing secondary contact 59 engageable with contact 54 on snap-over blade 53. In response to heat, wafer 58 flexes upwardly in a direction tending to break electrical engagement between contacts 54 and 59. Disclosed centrally within wafer 58 is an opening 61, the purpose of which will presently be described.

Electrically in contact with and disposed over wafer 58 is connecting leaf 31, previously mentioned. Above leaf 31 is still another ceramic washer 62 on top of which is placed a support blade 63. Rigidly secured through the outer end portion of support blade 63 is a nut 64 into which is received the threaded lower end portion of control shaft 25.

Seated within an end-wise opening in the lower end of shaft 25 is an actuating pin 66 which, with shaft 25 threaded into nut 64, projects downwardly through opening 61 into abutment with snap-over blade 53. Preferably, shaft 25 is a hollow cylinder internally threaded throughout its length to receive an adjusting plug 67 (FIG. 5) permitting screw driver adjustment of the amount by which the pin 66 projects downwardly for a given rotary position of shaft 25. Finally, a washer 68 is slipped over the upwardly projecting threaded portion 41 of pin 39 and a nut 69 is tightened down over threaded portion 41 to tightly press the stack assembly together.

Figure 7:
FIG. 7 is a schematic wiring diagram of the plug assembly of the preceding figures coupled to the heater of an appliance.

Operation of the thermostatic switch assembly may best be understood by reference to FIG. 7 which illustrates the essential elements of stack 24 electrically connected between power input terminal 26, 28 and output receptacles 13 with the latter being electrically connected to the heater 70 of the associated coffee maker. At the beginning of operation assume snap-over blade 53 to be in its lower stable position in which contacts 47, 55 are electrically engaged. Thus, the incoming supply leads are connected across heater 70 whereupon the latter is energized to initiate the brewing cycle and neon tell-tale light 21 is extinguished. The coffee maker preferably operates on the so-called "cold-pump" principle whereupon circulation of the liquid within chamber 17 is almost immediately initiated. In this conventional type of percolating cycle, the coffee has been brewed to a sufficient strength when the temperature thereof reaches a value within the range generally between 180° and 190° F.

As the coffee acquires an increasing temperature, the temperature rise is detected by prong 15 and the heat conducted thereby to bi-metal wafer 42 flexes the latter upwardly and pushes contact 55 with contact 47. At the selected peak temperature, indicating the desired termination of brewing time, snap-over blade 53 moves from its lower stable position to its upper stable position breaking the heater-energizing circuit through contacts 47, 55. At the same time, electrical connection is made between contacts 54 and 59 whereupon the energizing current for heater 70 flows in a second path through the latter contacts. Wafer 58 is responsive to the current flow in this second path to move contact 59 in a direction away from contact 54 and eventually break connection between these two contacts. For heating wafer 58, dependence may be had upon the resistance of the bi-metal wafer itself since the latter is then conductive of the energizing current for heater 70. Alternatively, a separate heater element 71, indicated in FIG. 7, may be wrapped around bi-metal wafer 58 and electrically connected in series between connecting leaf 31 and a point near contact 59.

Upon breaking of the connection between contacts 54 and 59, bi-metal wafer 58 commences cooling whereupon it flexes downwardly toward snap-blade 53 until contacts 59 and 54 reengage whereupon wafer 58 is again heated. It will therefore be observed that the initial brewing cycle is the result of electrical connection of contacts 47 and 55. But when the brewing temperature reaches the predetermined maximum level determinative of desired brewing strength, the latter contacts are broken and a new electrical circuit is completed between contacts 54 and 59. This latter warming circuit is alternately broken and made in response to cyclic temperature variations which may be caused either by the self-conducted cyclic current in bi-metal wafer 58 or by cyclic temperature as the result of cyclic current conducted in heater 71. In either case, the double-contact-bearing snap-over blade 53 is operative both in the brewing and in the subsequent warming cycles. Moreover, the same heater element and connections thereto are utilized within the coffee maker to serve both for brewing and for warming, eleminating the need for a plurality of heaters within the coffee maker as well as substantially minimizing the number of movable circuit elements required in the thermostatic switch assembly.

Once the primary switch comprising contacts 47 and 55 has opened in response to completion of the brewing cycle, the warming cycle takes over and is maintained in operation even though the externally supplied power might be temporarily disconnected as when moving the coffee maker from one room to another, that is, the auxiliary switch retains control as long as desired. In order to permit re-establishment of the brewing cycle, it is merely necessary to depress push-button 20. As illustrated in FIG. 5, push-button 20 is biased by an internally housed spring 75 to an upward position, the push button being disposed within an upright cylindrical housing 76 formed as a part of main housing 10. Projecting toward stack 24 from push button 20 is a finger 77 normally disposed in a position above snap-over blade 53. When the latter is in its upper position corresponding to the warming cycle, depression of the button 20 moves finger 77 downward to engage the free end of blade 53 and force the latter downwardly into its lower stable position whereupon contacts 55 and 47 are once again engaged to initiate brewing. Light 21 is lit whenever heater 70 is de-energized and flashes on and off during the warming cycle.

By screwing control shaft 25 downwardly in response to rotation of knob 19 the pressure of pin 66 upon snap-over blade 53 is increased, delaying the point at which it flexes from its first staple position to its second. That is, for brewing stronger coffee knob 19 is turned clockwise as the result of which bi-metal wafer 42 must flex to a greater degree in order to cause snap-over from the brewing cycle to the warming cycle.

In order to guard against the possibility of the user turning control knob 19 an excessive amount whereby snap-over blade 53 would be biased downwardly a distance sufficiently large to prevent breaking of contacts 55 and 57 upon completion of a "strong" brewing cycle, limiting stop 51 prevents excessive movement of snap-over blade 53 downwardly under pressure of pin 66. As a result, a degree of safety may be built into the unit by making it impossible for the user to accidentally twist control knob 19 to such an extent as to damage the unit by extending the brewing cycle indefinitely.

Having now gained a full understanding of the details of the embodiment illustrating the present invention, it will be apparent that the thermostatic switch assembly described is representative of the utmost in smplicity considering that it is capable not only of controlling an initial heating cycle but is responsive to completion of that cycle for initiating and carrying out the control of subsequent periodic-type temperature-maintaining cycle. Once initiated by termination of the initial heating cycle, the latter temperature-maintaining or warming cycle is completely independent of the former. Yet, upon the depression of a simple push button or the like the entire assembly is restored to a condition of readiness for beginning a new heating cycle. The assembly itself is readily fabricated and by reason of utilizing conventional parts in its construction is most economical to manufacture. Because only simple, flat, strip-like elements need be employed within the switch assembly, and because the entire formation is rigidly secured together, the entire unit is capable of withstanding the most rugged wear and tear. In a typical embodiment wherein heater 70 had a capacity of 600 watts and a resistance of 22 ohms, a bi-metal element for warming-cycle wafer 58 of 0.3 ohm resistance was found to demonstrate excellent operational characteristics with superb efficiency. Incorporation of the entire movable assemblage, with the exception of the reset push button 20, in a single stack of confined size permits construction of the entire appliance plug in a most compact form. Since prong 15 may most simply be a solid aluminum rod, damage to the plug assembly from blows inflicted upon the externally projecting prong is substantially avoided.

While essentially a single embodiment of the present invention has been illustrated and explained, it will be understood that the principles of the present invention and the basic inventive concepts are readily applicable to numerous variations and modifications. It will be understood therefore that the invention may be embodied otherwise than as herein specifically illustrated and described as falling within the scope of the appended claims.

We claim:

1. A thermostatic switch assembly comprising: means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; and means, including a secondary contact engageable with said second contact in said second position, responsive to cyclic temperature to move said second and secondary contacts alternately into and out of engagement while said second contact is in said second position.

2. A thermostatic switch assembly comprising: a snap-over blade carrying first and second oppositely facing contacts and responsive to movement of said contacts a selected distance away from a first stable position to snap the contacts on into a second stable position; means, including a primary contact engageable with said first contact only in said first position, responsive to a predetermined temperature change for moving the engaged first and primary contacts said selected distance; means, including a secondary contact engageable with said second contact in said second position, responsive to cyclic temperature to move said second and secondary contacts alternately into and out of engagement while said second contact is in said second position.

3. A thermostatic switch assembly comprising: means carrying first and second contacts and responsive to movement of said contacts a selected distance away from a first stable position to move the contacts further into a second stable position; a flexible blade carrying a primary contact in a position to engage said first contact only in said first position; means responsive to a predetermined temperature change for moving the engaged first and primary contacts said selected distance; and means, including a secondary contact engageable with said second contact in said second position, responsive to cyclic temperature to move said second and secondary contacts alternately into and out of engagement while said second contact is in said second position.

4. A thermostatic switch assembly comprising: means carrying first and second contacts and responsive to movement of said contacts a selected distance away from a first stable position to move the contacts further into a second stable position; a flexible blade carrying a primary contact in a position to engage said first contact only in said first position; a bi-metal wafer disposed on the side of said flexible blade away from said first contact and responsive to a predetermined temperature change to push the engaged first and primary contacts said selected distance; and means, including a secondary contact engageable with said second contact in said second position, responsive to cyclic temperature to move said second and secondary contacts alternately into and out of engagement while said second contact is in said second position.

5. A thermostatic switch assembly comprising: means carrying first and second contacts and responsive to movement of said contacts a selected distance away from a first stable position to move the contacts further into a second stable position; a flexible blade carrying a primary contact in a position to engage said first contact only in said first position; a bi-metal wafer carrying an insulating button projecting toward the side of said flexible blade away from said first contact and responsive to a predetermined temperature change to push said flexible blade with said button and move the engaged first and primary contacts said selected distance; means, including a secondary contact engageable with said second contact in said second position, responsive to cyclic temperature to move said second and secondary contacts alternately into and out of engagement while said second contact is in said second position.

6. A thermostatic switch assembly comprising: means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; a bi-metal wafer carrying a secondary contact in a position to engage said second contact in said second position and responsive to cyclic temperature to move said secondary contact alternately into and out of engagement with said second contact while the latter is in said second position.

7. A thermostatic switch assembly comprising: means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; and a bi-metal wafer carrying a secondary contact in a position to engage said second contact in said second position and responsive to self-conducted cyclic current to move said secondary contact alternately into and out of engagement with said second contact while the latter is in said second position.

8. A thermostatic switch assembly comprising: means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; a bi-metal wafer carrying a secondary contact in a position to engage said second contact in said second position and responsive to cyclic temperature to move said secondary contact alternately into and out of engagement with said second contact while the latter is in said second position; and a heater element disposed adjacent said wafer and responsive to cyclic current for subjecting said wafer to said cyclic temperature.

9. A thermostatic switch assembly comprising: means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; means, including a secondary contact engageable with said second contact in said second position, responsive to cyclic temperature to move said second and secondary contacts alternately into and out of engagement while said second contact is in second position; and manually operable means for returning said first and second contacts to said first position.

10. A thermostatic switch assembly comprising: means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; means, including a secondary contact engageable with said second contact in said second position, responsive to cyclic temperature to move said second and secondary contacts alternately into and out of engagement while said second contact is in said second position; and a spring-biased push button engageable upon depression with said first and second contact carrying means to return said first and second contacts to said first position.

11. A thermostatic switch assembly comprising: means carrying first and second contacts and responsive to movement of said contacts a selected distance away from a first stable position to move the contacts further into a second stable position; adjustable means for selecting said distance; means, including a primary contact engageable with said first contact only in said first position, responsive to a predetermined temperature change for moving the engaged first and primary contacts said selected distance; and means, including a secondary contact engageable with said second contact in said second position, responsive to cyclic temperature to move said second and said secondary contacts alternately into and out of engagement while said second contact is in said second position.

12. A thermostatic switch assembly comprising: bistable means carrying first and second contacts and responsive to movement of said contacts a selected distance away from a first stable position to move the contacts further into a second stable position; means, including a primary contact engageable with said first contact only in said first position, responsive to a predetermined temperature change for moving the engaged first and primary contacts said selected distance; adjustable means urging said bi-stable means toward said primary contact for selecting said distance; and means, including a secondary contact engageable with said second contact in said second position, responsive to cyclic temperature to move said second and secondary contacts alternately into and out of engagement while said second contact is in said second position.

13. A thermostatic switch assembly comprising: a snap-over blade carrying first and second oppositely facing contacts and responsive to movement of said contacts a selected distance away from a first stable position to snap the contacts on into a second stable position; means, including a primary contact engageable with said first contact only in said first position; responsive to a predetermined temperature change for moving the engaged first and primary contacts said selected distance; a bi-metal wafer carrying a secondary contact in a position to engage said second contact in said second position and responsive to cyclic temperature to move said secondary contact alternately into and out of engagement with said second contact while the latter is in said second position; and adjustable means including an endwise movable rod projecting through said wafer and abutting said blade for selecting said distance.

14. A thermostatic switch assembly comprising: a snap-over blade carrying first and second oppositely facing contacts and responsive to movement of said contacts a selected distance away from a first stable position to snap the contacts on into a second stable position; a flexible blade carrying a primary contact in a position to engage said first contact only in said first position; means responsive to a predetermined temperature change for moving the engaged first and primary contacts said selected distance; adjustable means for selecting said distance; stop means disposed between said flexible blade and said snap-over blade for limiting maximum adjustment of said distance; and means, including a secondary contact engageable with said second contact in said second position, responsive to cyclic temperature to move said second and secondary contacts alternately into and out of engagement while said second contact is in said second position.

15. A thermostatic switch assembly comprising: means carrying first and second contacts and responsive to movement of the contacts a selected distance away from a first stable position to move the contacts further into a second stable position; adjustable means for selecting said distance; means for limiting maximum adjustment of said distance; means, including a primary contact engageable with said first contact only in said first position, responsive to a predetermined temperature change for moving the engaged first and primary contacts said selected distance; and means, including a secondary contact engageable with said second contact in said second position, responsive to cyclic temperature to move said second and secondary contacts alternately into and out of engagement while said second contact is in said second position.

16. An appliance plug comprising: a housing of heat insulative material; a pair of power input terminals; a pair of outwardly facing female power output receptacles spaced apart in one end of said housing; a heat-conductive prong projecting outwardly from said housing between said female receptacle; means within said housing carrying a first and second contacts coupled to one of said power input terminals and responsive to movement of the contacts a selected distance away from a first stable position to move the contacts further into a second stable position; means within said housing, including a primary contact coupled to one of said power output terminals and engageable with said first contact only in said first position, rseponsive to a predetermined temperature change in said prong for moving the engaged first and primary contacts said selected distance; means within said housing, including a secondary contact coupled to said one power output terminal and engageable with said second contact in said second position, responsive to cyclic temperature to move said second and secondary contacts alternately into and out of engagement while said second contact is in said second position; and means coupling the other of said power input terminals to the other of said power output terminals.

17. A multi-purpose thermostatic switch stack comprising: a heat conductive member; a bi-metal wafer disposed against said heat conductive member and having a free end portion carrying an insulative button projecting away from one side thereof; a switch blade insulated from said wafer and disposed with one side contacting said button and with a contact projecting from the other side; a snap-over blade disposed on the side of said switch blade away from said wafer and carrying on its free end a pair of oppositely facing contact surfaces with one of said surfaces engageable with said switch blade contact, said snapover blade being insulated from said switch blade; a bi-metal blade insulated from and disposed on the side of said snap-over blade away from said wafer and carrying on its outer end a contact facing and engageable with the other of said contact surfaces when said snap-over blade is in a stable position toward said bi-metal blade, said bi-metal blade being alternately movable toward and away from said snap-over blade to correspondingly alternately make and break said bi-metal and snap-over contacts while said snap-over blade is in said position toward said bi-metal blade.

18. The combination defined in claim 17 in which said stack includes a nut held in a position on the side of said bi-metal blade away from said snap-over blade and a screw threaded in said nut and carrying a elongated rod projecting through said bi-metal blade into engagement with said snap-over blade to adjust the snap-over position of the latter.

19. The combination called for in claim 1 including a high heat conductive prong projecting at one end to a point remote from said responsive means and at the other end being disposed in intimate high heat exchange relationship with said responsive means.

References Cited in the file of this patent

UNITED STATES PATENTS

| | | |
|---|---|---|
| 1,431,542 | Ross | Oct. 10, 1922 |
| 1,813,267 | Arnesen | July 7, 1931 |
| 2,023,114 | Biebel | Dec. 3, 1935 |
| 2,023,119 | Biebel | Dec. 3, 1935 |
| 2,024,471 | Norton | Dec. 17, 1935 |
| 2,498,127 | Kuhn | Feb. 21, 1950 |
| 2,667,565 | Wallower | Jan. 26, 1954 |
| 2,729,159 | Huck et al. | Jan. 3, 1956 |
| 2,741,682 | Schwaneke et al. | Apr. 10, 1956 |
| 2,753,437 | Mertler | July 3, 1956 |
| 2,811,610 | Bletz | Oct. 29, 1957 |
| 2,936,359 | Sheahan | May 10, 1960 |

FOREIGN PATENTS

| | | |
|---|---|---|
| 599,517 | Great Britain | Mar. 15, 1948 |